United States Patent [19]

Katou et al.

[11] Patent Number: 5,238,311
[45] Date of Patent: Aug. 24, 1993

[54] SLIDING BEARING FOR AN INTERNAL COMBUSTION ENGINE

[75] Inventors: Zenichirou Katou, Mishima; Yoshikatsu Nakamura, Toyota; Katsuyuki Hashizume, Toyota; Soji Kamiya, Toyota, all of Japan

[73] Assignee: Toyota Jidosha Kabushiki Kaisha, Aichi, Japan

[21] Appl. No.: 925,040

[22] Filed: Aug. 6, 1992

[30] Foreign Application Priority Data

Aug. 9, 1991 [JP] Japan .................................. 3-200578
Oct. 29, 1991 [JP] Japan .................................. 3-283163

[51] Int. Cl.⁵ .............................................. F16C 17/02
[52] U.S. Cl. ...................................... 384/288; 384/292
[58] Field of Search ............... 384/288, 120, 398, 292, 384/291, 450, 111, 373

[56] References Cited

U.S. PATENT DOCUMENTS

| | | | |
|---|---|---|---|
| 4,120,544 | 10/1978 | Hüber | 384/292 |
| 4,538,929 | 9/1985 | Ehrentraut et al. | |
| 4,561,787 | 12/1985 | Ehrentraut et al. | |
| 4,606,653 | 8/1986 | Ehrentraut et al. | |
| 4,798,480 | 1/1989 | Van Beek | 384/120 |
| 5,046,863 | 9/1991 | Sakatani et al. | 384/292 |

FOREIGN PATENT DOCUMENTS 2-38714 2/1990 Japan .

Primary Examiner—Lenard A. Footland
Attorney, Agent, or Firm—Oliff & Berridge

[57] ABSTRACT

A sliding bearing for an internal combustion engine; the sliding bearing having a groove formed substantially circumferentially on an inner circumferential face of the sliding bearing; the width of the groove being smaller than 0.6 mm, and the ratio of the width of the groove to depth of the groove being larger than 40.

11 Claims, 5 Drawing Sheets

SLIDING BEARING FOR AN INTERNAL COMBUSTION ENGINE

BACKGROUND OF THE INVENTION

1. Field of the Invention

The present invention relates to a sliding bearing for an internal combustion engine.

2. Description of the Related Art

In a sliding bearing having a groove formed substantially circumferentially on an inner circumferential face of the sliding bearing; a sliding bearing in which a ratio $R(=B/H)$ of a width B of the groove to a depth H of the groove is equal to or larger than $1500/(1500-D)$ is known (Japanese Examined Patent Publication No. 63-11530). Where D mm is an inner diameter of the sliding bearing.

In this sliding bearing, when the inner diameter D of the sliding bearing is for example 70 mm, the ratio R is equal to or larger than 1.05. Namely, in this case, the ratio R is very small and in this case, the width B of the groove is substantially equal to the depth H of the groove. When the ratio R is too small, a problem arises in that a top portion of the groove wears easily and thus the wear resistance of the sliding bearing deteriorates.

SUMMARY OF THE INVENTION

An object of the present invention is to provide a sliding bearing with improved wear resistance.

According to the present invention, there is provided a sliding bearing for an internal combustion engine; the sliding bearing having a groove formed substantially circumferentially on an inner circumferential face of the sliding bearing; the width of the groove being smaller than 0.6 mm; and the ratio of said width of the groove to depth of the groove being larger than 40.

The present invention may be more fully understood from the description of the preferred embodiment of the invention set forth below, together with the accompanying drawings.

DESCRIPTION OF THE PREFERRED EMBODIMENTS

A first embodiment of the present invention is now described.

Figure 2:
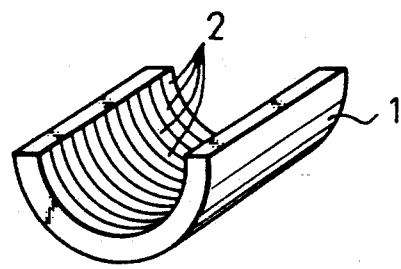
FIG. 2 is a perspective view of a lower half of a bearing for a crank shaft.

FIG. 2 is a perspective view of a lower half of a bearing for a crank shaft of an internal combustion engine. Referring to FIG. 2, a spiral groove 2 is formed substantially circumferentially on an inner circumferential face of the bearing 1.

Figure 3:
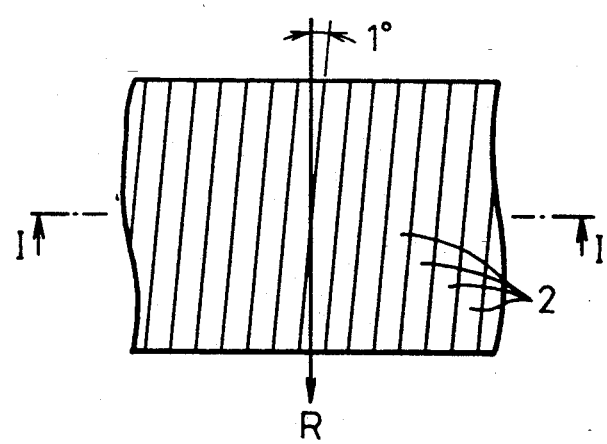
FIG. 3 is an expanded plan view of the bearing in FIG. 2.

FIG. 3 is an expanded plan view of the bearing 1 in FIG. 2. Referring to FIG. 3, the groove 2 is formed at 1° in a rotational direction R of the crank shaft (not shown).

Figure 1:
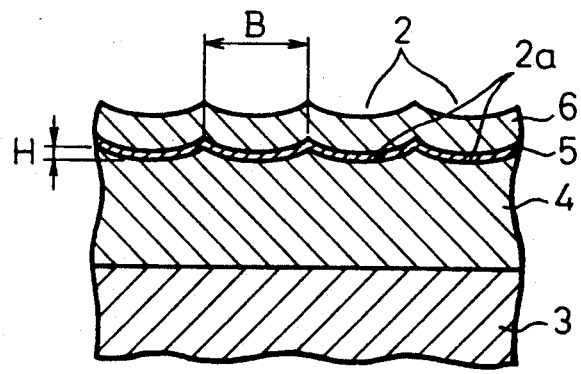
FIG. 1 is an enlarged sectional view of a sliding bearing according to a first embodiment of the present invention taken along the line I—I in FIG. 3.

FIG. 1 is an enlarged sectional view taken along a line I—I in FIG. 3. Referring to FIG. 1, a kelmet (an alloy of copper and lead) layer 4 as a bearing metal is formed on a bearing body 3 made of JIS SPCC steel. The thickness of the bearing body 3 is about 2 mm and the thickness of the kelmet layer 4 is about 0.15–0.30 mm. Grooves 2a are formed on the bearing surface (upper surface in FIG. 1) of the kelmet layer 4 by boring. The sectional shape of groove 2a is an arc. A width B of the groove 2a is equal to 0.261–0.30 mm and the depth H of the groove 2a is equal to 3–6 μm. Accordingly, the ratio R of the width B of the groove 2a to the depth H of groove 2a is equal to 43.5–100.

A nickel plating layer 5 is formed on the upper surface of the kelmet layer 4. The thickness of the nickel plating layer 5 is 1–3 μm. On the upper surface of the nickel plating layer 5, a lead alloy (Pb-Sn-In alloy) plating layer 6 is formed. The thickness of the lead alloy plating layer 6 is 12–20 μm. Since, the thickness of the nickel plating layer 5 and the thickness of the lead alloy plating layer 6 are substantially constant, grooves 2 similar to the grooves 2a formed on the upper surface of the kelmet layer 4 are formed on the upper surface of the lead alloy plating layer 6.

Table 1 shows an experimental relationship between wear resistance of the bearing and the width B of the groove 2a or the depth H of the groove 2a. The values in the table indicate the ratio R of the width B to the depth H. Also, in table 1, Δ represents a wear similar to the wear of a bearing without grooves 2, o represents wear less than the wear of a bearing without grooves 2, and ⊙ represents wear considerably less than wear of a bearing without grooves 2.

Note, the diameter of a crank shaft that is used for this experiment is 67 mm.

TABLE 1

| WIDTH | DEPTH | | | |
|---|---|---|---|---|
| | 2.5μ | 3.5μ | 4.5μ | 5.5μ |
| 0.15 mm | R = 60 | 43 | 33 | 27 |
| | | | | Δ |
| 0.20 mm | 80 | 57 | 44 | 36 |
| | ⊙ | ⊙ | ⊙ | Δ |
| 0.25 mm | 100 | 71 | 56 | 45 |
| | ⊙ | O | ⊙ | Δ |
| 0.30 mm | 120 | 86 | 67 | 55 |
| | O | ⊙ | ⊙ | O |

Figure 4:
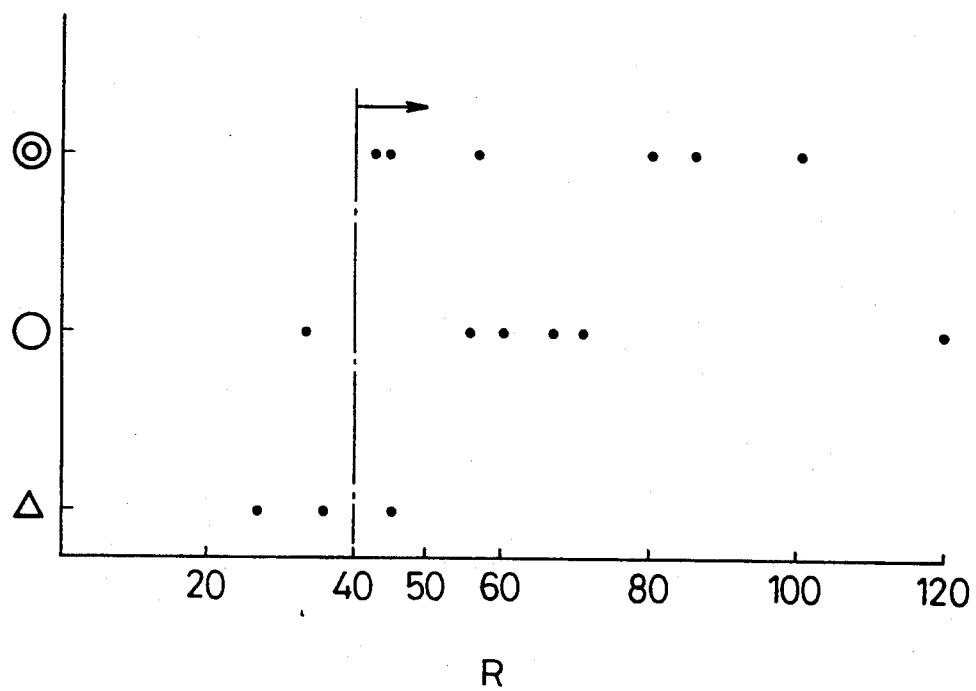
FIG. 4 is an experimental relationship between wear resistance of the bearing and the ratio R of the width to the depth.

FIG. 4 illustrates the relationship in table 1. In FIG. 4, the horizontal axis represents the ratio R of the width B to the depth H and the vertical axis represents an wear state. Referring to FIG. 4, when the ratio R is larger than approximately 40, the state of wear improves. That is, by making the ratio R larger than approximately 40, wear resistance can be improved compared to a bearing without a groove.

As mentioned above; according to the first embodiment, since the ratio R is made large, the top portion of the groove 2 hardly wears, and thus, the wear resistance of the bearing can be improved.

Figure 5:
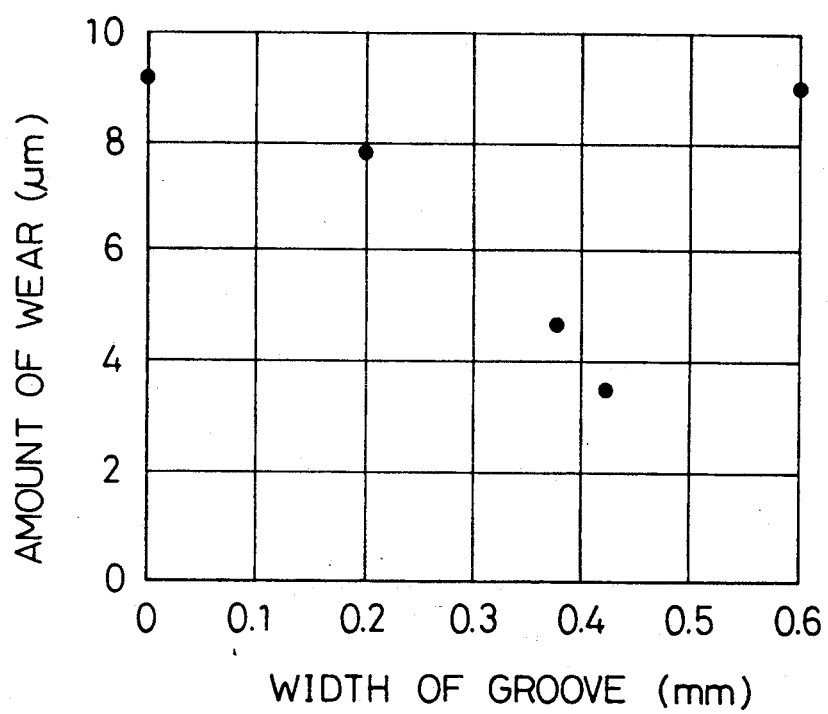
FIG. 5 is an experimental relationship between the width of the groove and an amount of wear of the bearing.

FIG. 5 shows an experimental relationship between the width of the groove and the amount of wear of the bearing.

Referring to FIG. 5, as the width of the groove becomes larger, the amount of wear becomes smaller. When the width of the groove becomes 0.6 mm, the amount of wear increases and becomes substantially equal to the amount of wear in which the width of the groove is 0, i.e., the groove is not formed. Accordingly, when the width of the groove is smaller than 0.6 mm, the amount of wear becomes smaller than a bearing without the groove.

Note, when the ratio R is larger than 200, and since cutting resistance increases, cutting is difficult. Therefore, the ratio R should be smaller than 200.

A second embodiment of the present invention is now described.

Figure 6:
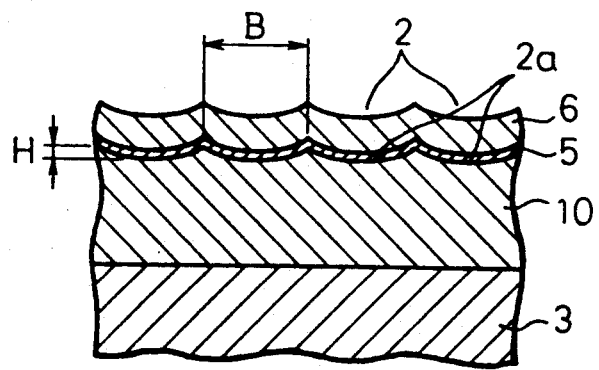
FIG. 6 is an enlarged sectional view of a sliding bearing according to a second embodiment of the present invention.

FIG. 6 illustrates a bearing according to the second embodiment of the present invention, and corresponds to FIG. 1. Referring to FIG. 6, an aluminum alloy (for example, Al-Sn-Cu) layer 10 as a bearing metal is formed on the bearing body 3 made of JIS SPCC steel. The thickness of the aluminum alloy layer 10 is 0.15–0.30 mm. Grooves 2a are formed on the bearing surface (upper surface in FIG. 6) of the aluminum alloy layer 10 similar to the first embodiment.

The width B of the groove 2a is 0.36–0.40 mm and a depth H of the groove 2a is 1.5–2.5 μm. Accordingly, the ratio of the width B of the groove 2a to the depth of the groove 2a is 144–267.

A nickel plating layer 5 is formed on the upper surface of the aluminum alloy layer 10. The thickness of the nickel plating layer 5 is 0.1–2.0 μm and is thinner than that in the first embodiment. On the upper surface of the nickel plating layer 5, a lead alloy (Pb-Sn-In alloy) plating layer 6 is formed. The thickness of the lead alloy plating layer 6 is 12–20 μm. On the upper surface of the lead alloy plating layer 6, the grooves 2 are formed similar to the first embodiment.

As in the first embodiment, when kelmet is used as a bearing metal, and since tin in the lead alloy plating layer 6 diffuses into the kelmet layer 4, the nickel plating layer 5 as a barrier layer needs to be thick. However, when the nickel plating layer 5 is thickened, and since tin in the lead alloy plating layer 6 combines with nickel in the nickel plating layer 5, the amount of tin in the lead alloy plating layer 6 is reduced and therefore lead corrosion occurs. The lead corrosion is promoted as surface stress on the bearing increases. Therefore, in the first embodiment, the surface stress on the bearing cannot be increased.

In the second embodiment, since the aluminum alloy layer is used as a bearing metal, tin in the lead alloy plating layer 6 barely diffuses into the aluminum alloy layer 10. Therefore the nickel plating layer 5 does not need to be thickened and serves as a bonding layer for bonding the aluminum alloy layer 10 and the lead alloy plating layer 6. Accordingly, tin in the lead alloy plating layer 6 barely combines with nickel in the nickel plating layer 5, and thus lead corrosion barely occurs. As a result, permissible surface stress on the bearing can be increased.

When lead corrosion does not occur, the maximum amount of wear of the crank shaft bearing is less than 10 μm during the life period of the internal combustion engine. In the second embodiment, since lead corrosion barely occurs and the thickness of the lead alloy plating layer 6 is sufficient for example, 12–20 μm, the lead alloy plating layer 6 does not wear out and thus the aluminum alloy layer 10 is not exposed. Since the permissible surface stress of the aluminum alloy layer 10 is lower than the permissible surface stress of the lead alloy plating layer 6, when the aluminum alloy layer 10 is exposed, the permissible surface stress of the bearing is lower.

In this embodiment, as mentioned above, since the thickness of the lead alloy plating layer 6 is sufficiently thick, the aluminum alloy layer 10 is not exposed during the life period of the internal combustion engine. Therefore the permissible surface stress of the bearing can be maintained at a high level.

For example, if the permissible surface stress of the bearing to which the second embodiment is not applied is 40 MPa, the permissible surface stress of the bearing can be made 50–60 MPa when the second embodiment is applied to the bearing.

Note, an overlay alloy, for example, a lead alloy or tin alloy can be used instead of the lead alloy plating layer 6.

Although the invention has been described with reference to specific embodiments chosen for purposes of illustration, it should be apparent that numerous modifications can be made thereto without departing from the basic concept and scope of the invention.

We claim:

1. A sliding bearing for an internal combustion engine; said sliding bearing having a groove formed substantially circumferentially on an inner circumferential face of said sliding bearing; the width of said groove being smaller than 0.6 mm, and the ratio of said width of said groove to depth of said groove being larger than 40.

2. A sliding bearing according to claim 1, wherein said ratio is smaller than 200.

3. A sliding bearing according to claim 1, wherein said groove is formed over an entire inner circumferential face of said sliding bearing.

4. A sliding bearing according to claim 1, wherein said groove is a spiral groove.

5. A sliding bearing according to claim 1, wherein said groove is formed at less than 1° to a rotational direction of a crank shaft.

6. A sliding bearing according to claim 1, wherein kelmet is used as a bearing metal, and said groove is formed on a bearing surface of said kelmet.

7. A sliding bearing according to claim 6, wherein a nickel plating layer is formed on said bearing surface of said kelmet, and a lead alloy plating layer is formed on said nickel plating layer.

8. A sliding bearing according to claim 7, wherein the thickness of said nickel plating layer is 1–3 μm.

9. A sliding bearing according to claim 1, wherein an aluminum alloy is used as a bearing metal, and said groove is formed on a bearing surface of said aluminum alloy.

10. A sliding bearing according to claim 9, wherein a nickel plating layer is formed on said bearing surface of said aluminum alloy, and a lead alloy plating layer is formed on said nickel plating layer.

11. A sliding bearing according to claim 10, wherein a thickness of said nickel plating layer is 0.1–2.0 μm.

* * * * *

UNITED STATES PATENT AND TRADEMARK OFFICE
CERTIFICATE OF CORRECTION

PATENT NO.  : 5,238,311
DATED       : August 24, 1993
INVENTOR(S) : Zenichirou KATOU; Yoshikatsu NAKAMURA; Katsuyuki HASHIZUME; and Soji KAMIYA It is certified that error appears in the above-identified patent and that said Letters Patent is hereby corrected as shown below:

On the Title Page:

[73] Assignee: Please add the following:
         --TAIHO KOGYO CO., LTD., Aichi, Japan--

Signed and Sealed this

Second Day of August, 1994

Attest:

BRUCE LEHMAN

Attesting Officer

Commissioner of Patents and Trademarks